United States Patent [19]

Reisgies

[11] 3,991,716
[45] Nov. 16, 1976

[54] PNEUMATIC TEAT CUP DETACHING APPARATUS

[75] Inventor: Rolf W. Reisgies, Norco, Calif.

[73] Assignee: Germania Dairy Automation Incorporated, Corona, Calif.

[22] Filed: June 9, 1975

[21] Appl. No.: 585,193

[52] U.S. Cl. .......................................... 119/14.08
[51] Int. Cl.² .......................................... A01J 7/00
[58] Field of Search............. 119/14.08, 14.1, 14.13

[56] References Cited
UNITED STATES PATENTS

| | | | |
|---|---|---|---|
| 3,246,631 | 4/1966 | Holm | 119/14.08 X |
| 3,603,292 | 9/1971 | Finch | 119/14.08 |
| 3,861,355 | 1/1975 | Johnson et al. | 119/14.08 |
| 3,870,021 | 3/1975 | Nederbragt | 119/14.13 |

Primary Examiner—Hugh R. Chamblee
Attorney, Agent, or Firm—Theodore J. Long; John M. Winter; Harry C. Engstrom

[57] ABSTRACT

Apparatus for sensing the milk flow from an animal being milked, and for detaching the teat cups from the udder of the animal after the milk flow has substantially stopped. Sensing of the milk flow and detachment of the teat cups is accomplished with pneumatic controls, without the use of any electrical circuitry. Means are provided to shut off the milking vacuum to the teat cups to aid in detachment of the teat cups from the animal.

8 Claims, 2 Drawing Figures

PNEUMATIC TEAT CUP DETACHING APPARATUS

BACKGROUND OF THE INVENTION

1. Field of the Invention

This invention pertains generally to automatic milking machines and to apparatus used therewith for automatically detaching the teat cups from the udder of a milking animal after the animal has been milked out.

2. Description of the Prior Art

Automatic milking machines have been developed which are capable of sensing termination of the flow of milk from a cow being milked, and which will shut off the milking vacuum to the teat cups and detach the teat cups from the udder of the animal after milk flow has substantially stopped. Although it is common practice in the manual detaching of the teat cups to simply pull the cups off of the teats of the animal without shutting off the milking vacuum, most automatic detachers provide for shut off of the vacuum to minimize the possibility of irritation of the teats and development of mastitis.

The known teat cup detachers typically utilize electrical control circuitry to monitor the flow of milk from the teat cups and to sense when this flow has substantially stopped. The sensing of the continued milk flow is typically accomplished by accumulating milk in a small receptacle from which the milk slowly drains, and passing electrical current through the milk to detect its presence. When milk flow has stopped, the receptacle will eventually drain of milk and cut off electric current to actuate detachment of the teat cups. The use of such electrical sensing circuitry allows the possibility of shocks to the animal and to the operators, and may present reliability problems in the inherently wet environment of a milking parlor. Since the flow sensors commonly utilized in such electrical sensing circuits require that the milk slowly drain from the receptacle, the outlet from these receptacles must be relatively small to restrict the flow of milk. Such small orifices tend to clog easily, especially in the common situation where the milk contains partially congealed milk particles. It is often necessary to clean these orifices between milkings to ensure proper functioning of the equipment, with a consequent substantial slow down in the milking process. Sensors of this type often are incapable of sensing flow rates less than one-half pound per minute, although such lower flow rates may still represent a significant flow of milk from the particular cow being milked.

SUMMARY OF THE INVENTION

I have invented a fully automatic teat cup detaching apparatus which can be utilized with present milking machines. My detaching apparatus operates entirely pneumatically without the need for any electrical control circuitry whatever, and consequently is highly reliable and does not present the possibility of electrical shocks. A flow sensor is provided which can detect very low flow rates and which does not require a restricted orifice and thus is not subject to clogging.

My detaching apparatus is adapted to operate utilizing air under pressure, which is commonly available in milking parlors in addition to the vacuum lines used in the milking operation itself. Pneumatically actuated drive means are provided to draw the teat cups away from the udder when the drive means are supplied with air under pressure. A milk flow shut off valve responsive to air under pressure is connected in the milk line, such that when air under pressure is directed to the milk flow valve will shut off the milk line and will thus cut off the vacuum to the teat cups. A pneumatic control is provided which includes the milk flow sensor in the milk line to sense when milk flow has substantially stopped, and to provide air under pressure to the drive means and to the milk flow valve a selected period of time after milk flow has subsided. The time delay ensures that the cow has been completely milked out and has not simply temporarily stopped providing milk. The time delay is preferably kept suficiently short so that there is no possibility of over milking and injury to the teats of the animal. All the control functions are accomplished with pneumatic components which are highly reliable and which present little danger of contamination to the milk.

Further objects, features and advantages of my invention will be apparent from the following detailed description taken in conjunction with the accompanying drawings showing a preferred embodiment of a pneumatic teat cup detaching apparatus exemplifying the principles of my invention.

DESCRIPTION OF THE PREFERRED EMBODIMENT

Figure 1:
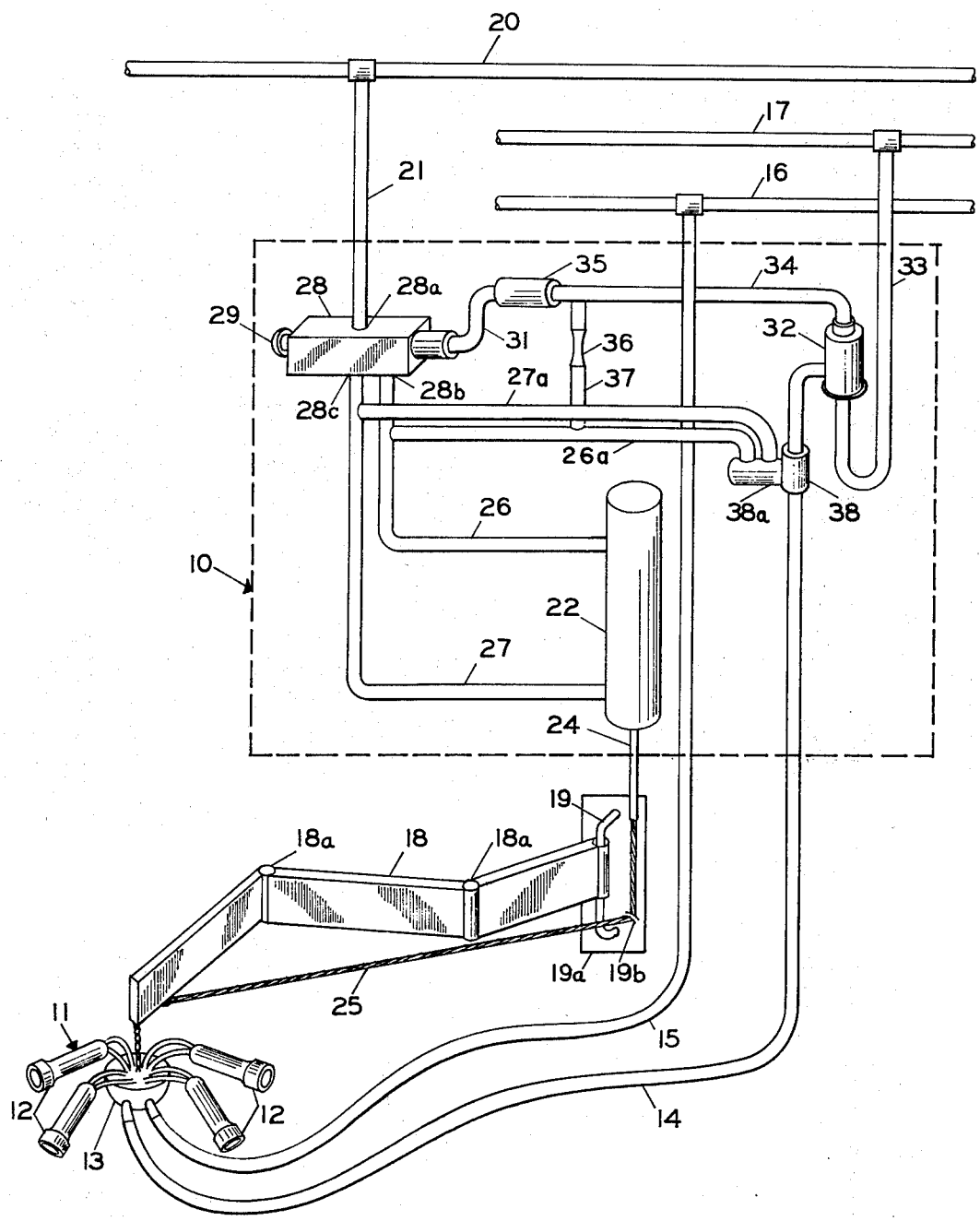
FIG. 1 is a perspective view of my pneumatic teat cup detaching apparatus showing the arrangement of the parts thereof.

Referring now more particularly to the drawings, wherein like numerals refer to like parts in both views, a preferred embodiment of my milk flow sensing teat cup detaching apparatus is shown generally within the dashed lins labeled 10 in FIG. 1. The detaching apparatus 10 is intended to be used for the detachment of the usual teat cup cluster 11 from the udder of a milking cow. My invention does not depend upon the type of teat cup cluster utilized or its method of operation, but for purposes of illustration the cluster 11 is shown with the usual teat cups 12 and milk claw 13. A flexible rubber or plastic milk line 14 and a flexible pulsating vacuum line 15 are also connected to the claw. The vacuum line 15 is connected to a main source line 16 which carries a pulsating vacuum pressure/ The milk in the line 14, after passing through the detaching apparatus 10, is carried to a main milk line 17 which has a constant vacuum applied to it. The milking system of FIG. 1 is shown for illustration only, and other modifications of standard milking systems may be used with equal success with my teat cup detaching apparatus.

The teat cup cluster 11 is shown in FIG. 1 supported by a flexible arm 18. The arm 18 provides a vertical support to the milking cluster 11 and may be extended out to allow the cluster to be placed under the udder of an animal. After the animal has been milked, the teat cups 12 may be drawn away from the teats by swinging the arm 18 away from the udder and by folding the arm at its hinges 18a. The arm 18 is also capable of rotation in a horizontal plane around a hinge post 19 which is connected by a plate 19a to a wall or other support. Other means may be used to support the teat cluster 11 in position beneath the udder of an animal if such support allows retraction of the teat cluster away from the udder after milking operation has ceased.

The teat cup detaching apparatus 10 is capable of automatically withdrawing the teat cup cluster away from the udder of the animal after the detaching apparatus detects that the animal has been adequately milked out. The detachment and withdrawal of the teat cups and the sensing of the milk flow are accomplished entirely pneumatically, without the necessity for providing any electrical circuitry whatever. As indicated above, this eliminates any possibility of electrical shocks to the animal or the operator, or the possibility of electrical malfunctions which are common in areas where liquids are present. The operative air pressure is supplied to the apparatus 10 from a main air pressure line 20 through a feeder conduit 21. Drive means for mechanically retracting the teat cups from the udder is provided by a pneumatic cylinder 22 having a piston 23 (not shown in FIG. 1) movably contained therein. The piston 23 is mechanically linked to the teat cups for withdrawal thereof by a rigid bar 24 which is attached to the piston and protrudes from the bottom end of the cylinder, with the bar 24 being attached to a flexible rope 25. The rope 25, which may be replaced with any other flexible member such as a chain or braided metal chord, is preferably attached to the end of the flexible arm 18 and is turned around a bracket 19b on the plate 19a such that the arm will be retracted when the piston 23 moves up within the cylinder 22 and the rope 25 is pulled toward the cylinder. The piston 23 in the cylinder 22 may be spring loaded to return the rope 25 to a slack condition when the air pressure to the cylinder is released. Alternatively, as shown in FIG. 1, the rope 25 can be left slack for extension of the arm 18 toward the udder of an animal if the piston has an air pressure differential in the cylinder 22 applied thereacross by a first conduit 26 applying air under pressure to the upper portion of the cylinder and with a second conduit 27 venting the lower portion of the cylinder to atmospheric pressure. This would force the piston 23 downward in the cylinder and allow sufficient slack in the rope 25. The piston can be forced upward in the cylinder by applying air under pressure thereto from the second conduit 27 and venting the first conduit 26 to the atmosphere.

Air pressure is selectively supplied to the two conduits 26 and 27 by means of a pneumatic control valve 28 which itself receives air under pressure from the feeder conduit 21 to an input port 28a. The control valve 28 is preferably a four-way valve which may be manually placed in a first air distribution position by depression of a push button 29, and is switchable into a second air distribution position by an air pressure sensitive pilot drive 30. The pilot drive 30 is responsive to air pressure provided to it by a pneumatic line 31 such that the pilot drive will switch the positions of the control valve 28 only if a certain predetermined pressure is exceeded in the pneumatic line 31. The valve 28 has a first output port 28b connected to the pneumatic conduit 26 and a second output port 28c connected to the pneumatic conduit 27. When the valve 28 is in its first position, the first output port has air under pressure directed thereto and the second output port is vented to the atmosphere. When the valve is in the second position, the second output port has air under pressure directed thereto while the first output port is vented to the atmosphere.

When the milking machine operator depresses the push button 29, air is supplied under pressure to the conduit 26 and the conduit 27 is vented to the atmosphere. This causes the piston within the cylinder 22 to be pushed toward the bottom of the cylinder 22 and allows maximum extension of the arm 18 toward the udder of the cow. The vacuum line 15 is open to the pulsating vacuum provided in the main source line 16, and the milk line 14 is provided with the vacuum from the constant vacuum main milk line 17 and is capable of having milk flowing therethrough. As the cow becomes milked out, the milk will flow less constantly in the milk line 14, and will tend to flow through the line in surges. Eventually the cows are milked to the point where only small surges of milk are present in the line 14. Leaving the milking vacuum on for a substantial period of time at this point would over-milk the cow and tend to cause damage to the teats of the cow, possibly leading to such diseases as mastitis. A pneumatic milk flow sensor 32 is capable of sensing the substantial stoppage of the milk flow, and of controlling the remainder of my teat cup detaching apparatus to cause cessation of the milking operation at the proper time. After passing through the sensor 32, the milk continues unimpeded through a milk line 33 to the main milk line 17. Cessation of milk flow causes the sensor 32 to allow air pressure to build up in a pneumatic line 34 and an air pressure accumulator 35 which are provided with air under pressure through a restriction 26 and pneumatic line 37. The air pressure accumulator 35 is in communication with the pneumatic line 31, so that the air pressure building up in the accumulator 35 will eventually exceed the operative pressure of the pilot drive 30, resulting in switching of the control valve 28 to its second distribution position. The operation of the control circuit will be explained in greater detail below.

Retraction of the arm 18 by the rope 25 will cause the teat cups 12 to be physically pulled off the teats even if the milking vacuum in the milk line 14 has not been shut off. While it is common in non-automatic milking operations for the operator to simply physically pull the cup off of the teat while milking vacuum is maintained, this procedure has sometimes led to complications such as mastitis. Thus, to relieve the milking vacuum in the line 14 to the teat cups, a milk flow shut off valve 38 is preferably pneumatically operated by a cylinder piston portion 38a which is responsive to air pressures supplied thereto by pneumatic lines 27a and 26a. As shown in FIG. 1, the pneumatic line 27a is in communication with the conduit 27, and provides air under pressure to the cylinder piston portion 38a to cause the valve 38 to shut off when the control valve 28 has been placed in its second position. The pneumatic line 26a is connected to the pneumatic line 37 and to the conduit 26 which would be vented to atmospheric pressure when air pressure was supplied on the pneumatic line 27a. Reversal of the air pressure on the lines 26a and 27a will cause the shut off valve to open.

Figure 2:
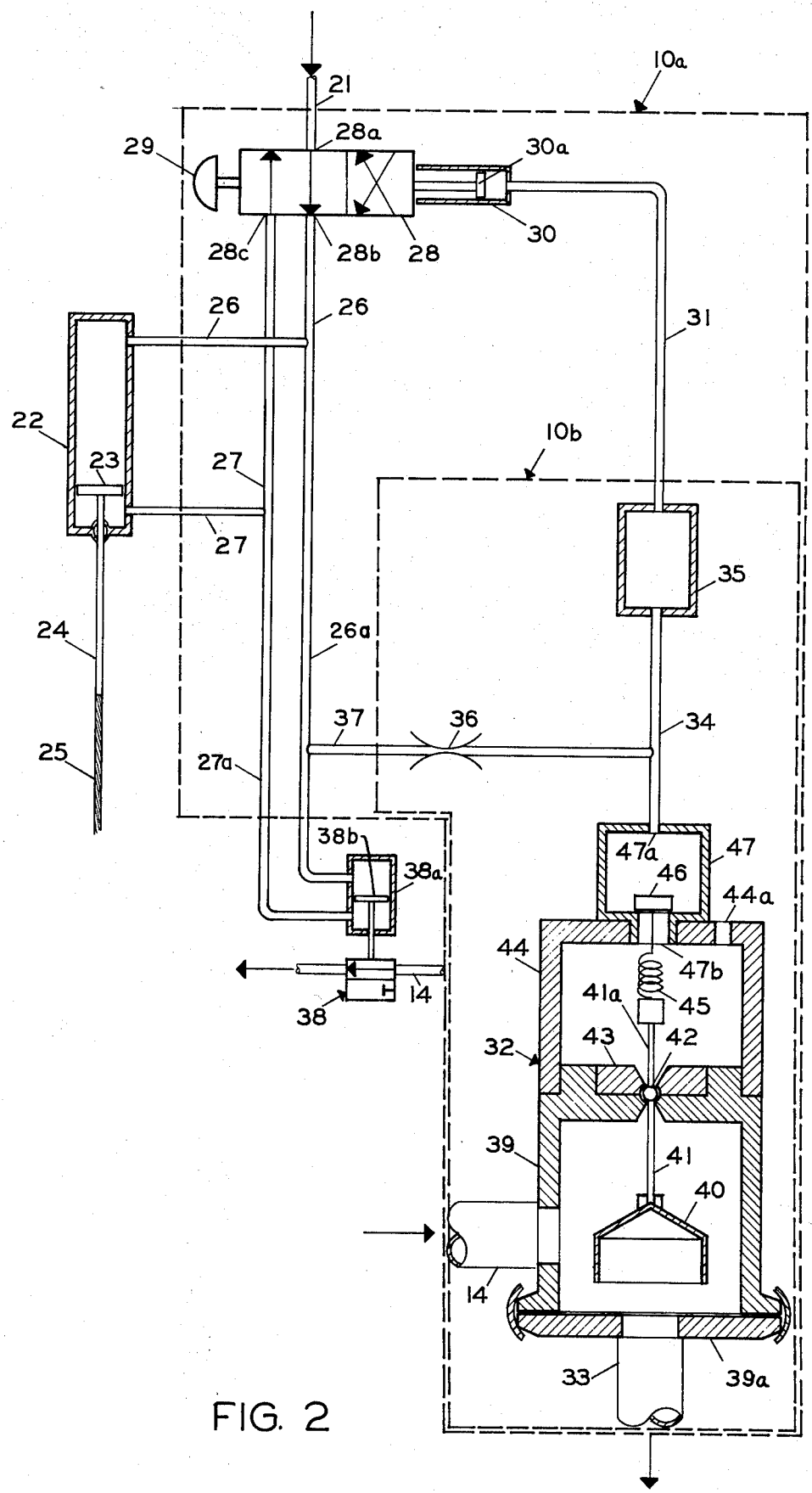
FIG. 2 is a schematic view of the teat cup detaching apparatus of FIG. 1 with the milk flow sensor shown in detailed cross section.

The operation of my milk flow sensing teat cup detaching apparatus is best explained with reference to FIG. 2, which is a somewhat simplified schematic view of my detaching apparatus. The pneumatic control portion of my apparatus is shown within the dashed lines labeled 10a in FIG. 2 and provides air under pressure to the cylinder 22 and the milk flow valve 38 at the proper time after milk flow has substantially stopped. The valve 28 of the pneumatic control 10a is shown in FIG. 2 in the "milking position" or first air distribution position after an operator has depressed the push button 29. Air under pressure flows from the feeder conduit 21 to the first output port 28b and the conduit 26, causing the piston 23 to move downward in the cylinder 22 and to allow the rope 25 to be extended to its maximum position. This allows the operator to extend the teat cup cluster 11 out to the udder of an animal. The air under pressure in the conduit 26 is also provided to the cylinder-piston unit 38a of the shut off valve 38 to cause the valve to remain open and allow milk in the line 14 to flow therethrough.

Again referring to FIG. 2, the control circuit which controls the operation of the pilot drive 30 and the valve 28 is shown within the dashed lines labeled 10b. The line air pressure is also present on the pneumatic line 37 which runs into the restrictor 36, or timing orifice. The orifice 36 impedes the flow of air therethrough and allows a slowly decreasing pressure drop to exist between the line 37, which is at supply air pressure, and the line 34, which is initially atmospheric pressure. The air that flows through the restrictor 36 passes into the line 34, the accumulator 35, and the pneumatic line 31. The pressure in the line 37 is provided from the feeder conduit 21 and is substantially higher than atmospheric pressure, typically in the range of 70 psi, providing for a fairly constant flow of air through the restrictor 36. Eventually, the air pressure on the other side of the restrictor 36 builds up until the piston 30a in the pressure sensitive pilot drive 30 has sufficient pressure applied thereto to "trip" and break free, pushing the valve 28 to its "retracting position" or second air distribution position. The pilot drive 30 is a standard component which typically may have a rubber gasket on the piston 30a that snaps loose to allow the piston to move after sufficient force is applied to it. The amount of air pressure required can be chosen to be any convenient pressure which is less than the supply pressure. The period of time that it is required after air pressure is applied to the restrictor 36 to cause the pilot drive 30 to trip may be selected by adjusting the volume of the accumulator 35 and the connecting pneumatic lines, and by adjusting the size of the timing orifice in the restrictor. However, since milking cows vary considerably in the amount of time required to milk them down completely, it is, of course, desirable to prevent the tripping of the pilot drive 30 before the cow has been substantially milked out. Monitoring of the milk flow from the cow may be accomplished by means of the milk flow sensor 32. As shown in FIG. 2, the sensor preferably has a lower housing 39 which has a milk flow cavity therein. Milk flows into the housing 39 from the milk line 14 and flows out of the milk flow cavity through the milk flow line 33 which is in communication with the cavity at the bottom wall 39a thereof. Within the milk flow cavity, a preferably bell shaped paddle 40 is suspended for pendulous movement from a rod 41 which passes through and is attached to a polished ball 42 of somewhat larger diameter than the rod 41. The ball 42 seats in an opening in the upper part of the lower housing 39, allowing the bell paddle 40 suspended therefrom to swing freely from the ball within the lower housing cavity. A cap member 43 fits onto the top of the lower housing and fits over the top of the ball to hold the same in place and to substantially seal off the milk flow cavity. An upper housing 44 is attached to the top of the lower housing 32 to form an upper cavity in which the top portion 41a of the rod 41 may swing freely. The top portion 41a of the rod extends out of the milk flow cavity and is attached by a wound spring 45 to a small poppet valve closure member 46. The closure member 46 is contained within the cavity of a sensor valve housing 47 which has an inlet opening 47a at the top thereof which is in communication with the pneumatic line 34, and which has an outlet opening 47b at the bottom thereof which is in communication with the cavity in the upper housing 44. The closure member 46 is preferably circular and has a somewhat larger diameter than the preferably circular opening 47b in the valve housing 47 that leads into the cavity of the housing 44. Air under pressure in the line 34 normally keeps the closure member 46 tightly closed against the bottom inside walls of the valve housing 47 so that little if any air can pass through the opening in the bottom of the valve housing. However, when milk surges through the line 14 and impacts against the bell paddle 40, the paddle 40 swings over causing the top of the rod 41a to swing in the opposite direction, and which thereby pulls the closure member 46 to one side of the outlet opening 47b. A small open space is thus provided which allows air to leak through the opening in the valve housing 47 and pass into the cavity of the upper housing 44. An opening 44a in the upper housing 44 allows the air under pressure from the line to exhaust out into the atmosphere. It can be seen that as long as milk impacts against the bell paddle 40, the closure member 46 will open and allow air to pass out of the pneumatic lines 34 and the pneumatic accumulator 35. Thus, air pressure will not substantially build up in the accumulator 35 and in the air line 31 leading to the pressure sensitive pilot 30 as long as substantial amounts of milk continue to flow. Only after milk flow has substantially stopped, such that no milk will issue with sufficient force to impact against the bell paddle 40, will pressure be allowed to build up in the air lines leading to the pilot drive 30 to cause the pilot to trip. The sensitivity of the flow sensor may be adjusted by changing the size of the bell shaped paddle 40 and its closeness to the milk inlet from the milk line 14, and by adjusting the tightness with which the ball pivot 42 is held. Milk flow may generally be considered to have substantially stopped when the flow is less than from 2 to 8 ounces per minute. The flow sensor 32 may be adjusted so that such flow levels do not cause motion of the paddle 40 sufficient to open the valve closure member 46.

Because the pivoting ball 42 is sealed against the lower housing 39 with the cap member 43, the milk flow cavity in the lower housing 39 is essentially sealed off from the cavity in the upper housing 44 which is open to the atmosphere. Thus there is little chance for contamination of the milk flowing through the sensor 32. Alternatively, it is possible to suspend the rod 41 for free pendulous movement of the paddle 40 by means of a flexible membrane which would be attached to the rod and to the lower housing, and which would seal against both and thus separate the upper cavity from the lower milk flow cavity.

As shown in FIG. 2, when sufficient pressure has been attained in the pneumatic line 31, the piston 30a of the pressure sensitive pilot drive 30 will break free and will push the valve 28 into its second air distribution position. In this second position the air under pressure from the feeder conduit 21 will be provided to the conduit 27. This will cause high pressure to be provided to the pneumatic line 27a and will force the piston 38b in the cylinder piston unit 38a upwards, thereby turning the valve 38 to its off position and preventing flow of milk in the line 14. The milking vacuum in the teat cups will thus be shut off. The line 26a and the first conduit 26 are of course open to the atmosphere in this position. Air under pressure will also be fed through the line 26 to the lower portion of the cylinder 22, causing the piston 23 to move upwardly in the cylinder. As the piston moves upwardly, pulling the rigid bar 24 and the rope 25 along with it, the teat cup cluster 11 will be pulled away from the udder of the animal and retracted. It is preferable that the milking vacuum be shut off by the valve 38 before the test cup cluster is substantially retracted to prevent unnecessary pulling on the teats of the animal by the teat cups under vacuum. Thus the valve 38 should shut off the milk flow on the line 14 before the piston 23 begins to retract the teat cup cluster. This is easily accomplished in my detaching apparatus since the valve 38 may be connected to the source of air pressure at the valve 28 by a shorter length of conduit than that leading to the cylinder 22, and will result inherently because the cylinder piston portion 38a has a much smaller displacement than the cylinder 22, and will cause tripping of the valve 38 before the piston 23 has an opportunity to substantially move within the cylinder 22 and retract the teat cup cluster.

It is apparent that the detaching apparatus of my invention can easily be modified to accomplish other standard operations associated with milking machines. For example, a shut off valve could easily be provided in the vacuum air line 15 to shut off the pulsating vacuum to the teat cups when the teat cup cluster was to be retracted.

It is understood that my invention is not confined to the particular construction and arrangement of parts herein illustrated and described, but embraces all such modified forms thereof as come within the scope of the following claims.

I claim:

1. Apparatus for pneumatically detaching the milking machine teat cups and associated milk line from the udder of an animal after the animal has substantially stopped providing milk, comprising:
    a. drive means operably connected to said teat cups for drawing said teat cups away from said udder when said drive means is supplied with air under pressure;
    b. milk flow valve means connected in the milk line leading from said teat cups for shutting off said milk line and the milking vacuum to said teat cups when said milk flow valve means is supplied with air under pressure; and
    c. pneumatic control means adapted to receive air under pressure, said pneumatic control means including a control valve and also including milk flow sensor means connected in said milk line for sensing milk flow in said milk line, said sensor means having an opening for venting air supplied to said sensor means and having valve means for cutting off the flow of air from said opening upon substantial cessation of milk flow to said sensor means to allow a build-up of air pressure to activate said control valve, said control valve upon such actuation providing air under pressure to activate said drive means and said milk flow valve means a selected period of time after said milk flow sensor means has sensed that the milk flow has substantially stopped.

2. The apparatus as specified in claim 1 wherein said drive means comprises a pneumatic cylinder having a piston movable therein, and wherein said piston is connected by a mechanical linkage to said test cups.

3. Apparatus for pneumatically detaching the milking machine teat cups and associated milk line from the udder of an animal after the animal has substantially stopped providing milk, comprising:
    a. a pneumatic control valve having an input port for receiving air under pressure and having first and second output ports and being switchable between first and second positions, wherein in said first valve position said first output port has air under pressure directed thereto from said input port and said second output port is vented to the atmosphere, and wherein in said second valve position said first output port is vented to the atmosphere and said second output port has air under pressure directed thereto from said input port;
    b. drive means operably connected to said test cups and pneumatically connected to said second output port of said valve for drawing said teat cups away from the udder of the animal when said drive means receives air under pressure from said second output port;
    c. pilot drive means for switching said control valve from its first position to its second position when air under pressure exceeding a selected trip pressure is provided thereto; and
    d. control circuit means pneumatically connected to said first output port of said control valve and including milk flow sensor means connected in the milk line from said teat cups, for providing air under pressure to said pilot drive means a selected period of time after the flow of milk through said flow sensor means has substantially stopped.

4. The apparatus as specified in claim 3 including a milk flow valve connected in said milk line which is pneumatically connected to said second output port of said control valve, said milk flow valve being responsive to air under pressure supplied thereto to shut off milk flow in said milk line and the milking vacuum to said teat cups.

5. The apparatus as specified in claim 3 wherein said pneumatic control means comprises: 1. a milk flow sensor connected in said milk line, said milk flow sensor having walls defining a milk flow cavity with an inlet port through which milk can flow in freely as it comes from the teat cups and an outlet port of sufficient size such that milk can flow freely out of the milk flow cavity and not accumulate therein, a paddle in said milk flow cavity which is suspended for pendulous movement therein from a rod a portion of which extends out of said milk flow cavity and which is pivotally mounted to the upper wall of said milk flow cavity, said paddle being in position to be deflected by surges of milk flowing into said milk flow cavity, a sensor valve housing having walls therein defining a cavity and having an inlet opening and an outlet opening in said sensor valve housing, said closure member being connected to said portion of said rod which extends out of said milk flow cavity such that deflections of said paddle deflect the extending portion of said rod and cause said closure member to move and open said outlet opening;
    2. a restriction orifice having an input which is pneumatically connected to said first output port of said control valve and an output which is pneumatically connected to the inlet opening of said milk flow sensor valve housing, said restriction impeding the flow of air therethrough; and 3. an air pressure accumulator having an input pneumatically connected to the inlet opening of said milk flow sensor valve housing and having an outlet pneumatically connected to said pilot drive means, whereby air pressure builds up in said accumulator over a selected period of time only after milk has substantially stopped flowing through said milk flow cavity and said valve in said milk flow sensor is not being opened by milk flowing therethrough.

6. A pneumatically operable milk flow sensor comprising:
   a. walls defining a milk flow cavity having an inlet port through which milk can flow in freely and having an outlet port of sufficient size such that milk can flow freely out of the milk flow cavity and not accumulate therein;
   b. a paddle in said milk flow cavity which is suspended for pendulous movement therein from a rod a portion of which extends out of said milk flow cavity and which is pivotally mounted to the upper wall of said milk flow cavity, said paddle being in position to be deflected by surges of milk flowing into said milk flow cavity;
   c. a sensor valve housing having walls therein defining a cavity and having an inlet opening and an outlet opening which is in communication with the atmosphere; and
   d. a valve closure member normally covering and closing said outlet opening in said sensor valve housing, said closure member being connected to said portion of said rod that extends out of said milk flow cavity such that deflection of said paddle deflects the extending portion of said rod and causes said closure member to move and open said outlet opening thereby allowing air under pressure provided to said inlet opening of said valve housing to be exhausted to the atmosphere.

7. Apparatus for pneumatically detaching the milking machine teat cups and associated milk line from the udder of an animal after the animal has substantially stopped providing milk, comprising:
   a. drive means operably connected to said teat cups for drawing said teat cups away from said udder when said drive means is supplied with air under pressure;
   b. milk flow valve means connected in the milk line leading from said teat cups for shutting off said milk line and the milking vacuum to said teat cups when said milk flow valve means is supplied with air under pressure;
   c. a pneumatic control valve having an input port for receiving air under pressure and having first and second output ports and being switchable between first and second positions, wherein in said first valve position said first output port has air under pressure directed thereto from said input port and said second output port is vented to the atmosphere, and wherein in said second valve position said first output port is vented to the atmosphere and said second output port has air under pressure directed thereto from said input port, and wherein said drive means and said milk flow valve means are pneumatically connected to said second output port whereby said drive means draws said teat cups away from said udder and said milk flow value means shuts off said milk line when said control valve is in its second position and has air under pressure supplied thereto;
   d. pilot drive means for switching said control valve from its first position to its second position when air under pressure exceeding a selected pressure is provided thereto; and
   e. control circuit means pneumatically connected to said first output port of said control valve and including milk flow sensor means for sensing milk flow connected in said milk line, for providing air under pressure to said pilot drive means which exceeds the trip pressure of said pilot drive means a selected period of time after the flow of milk through said flow sensor means has substantially stopped.

8. Apparatus for pneumatically detaching the milking machine teat cups and associated milk line fron the udder of an animal after the animal has substantially stopped providing milk, comprising:
   a. drive means operably connected to said teat cups for drawing said teat cups away from said udder when said drive means is supplied with air under pressure; and
   b. pneumatic control means adapted to receive air under pressure, said pneumatic control means including a control valve and also including milk flow sensor means connected in said milk line for sensing milk flow in said milk line, said sensor means having an opening for venting air supplied to said sensor means and having valve means for cutting off the flow of air from said opening upon substantial cessation of milk flow to said sensor means to allow a build-up of air pressure to activate said control valve, said control valve upon such actuation providing air under pressure to activate said drive means a selected period of time after said milk flow sensor means has sensed that the milk flow has substantially stopped.

* * * * *